United States Patent [19]

Band et al.

[11] Patent Number: 4,698,323

[45] Date of Patent: Oct. 6, 1987

[54] TRANSITION METAL CATALYST COMPONENT CONTAINING MAGNESIUM ALKOXY ALKOXIDES

[75] Inventors: Elliot I. Band, North Tarrytown; William E. Summers, III, Peekskill, both of N.Y.

[73] Assignee: Stauffer Chemical Company, Westport, Conn.

[21] Appl. No.: 912,298

[22] Filed: Sep. 29, 1986

[51] Int. Cl.$^4$ ............................................. C08F 4/64
[52] U.S. Cl. .................................... 502/133; 502/125; 502/127; 502/134; 526/124; 526/125
[58] Field of Search ................ 502/125, 127, 133, 134

[56] References Cited

U.S. PATENT DOCUMENTS

| | | | |
|---|---|---|---|
| Re. 31,099 | 12/1982 | Scata et al. | 252/429 B |
| 3,644,318 | 2/1972 | Diedrich et al. | 502/133 X |
| 4,126,627 | 11/1978 | Reifenberg | 568/851 X |
| 4,144,390 | 3/1979 | Derroitte et al. | 526/125 |
| 4,220,554 | 9/1980 | Scata et al. | 502/134 X |
| 4,277,372 | 7/1981 | Matlack | 252/429 B |
| 4,330,432 | 5/1982 | Beach et al. | 502/133 X |
| 4,447,587 | 5/1984 | Berthold et al. | 502/133 X |
| 4,448,944 | 5/1984 | Berthold et al. | 502/133 X |
| 4,460,701 | 7/1984 | Terano et al. | 502/104 |
| 4,485,186 | 11/1984 | Ueno et al. | 502/128 |
| 4,497,905 | 2/1985 | Nozaki | 502/107 |
| 4,562,173 | 12/1985 | Terano et al. | 502/127 |
| 4,565,798 | 1/1986 | Yamamoto et al. | 502/127 X |
| 4,634,786 | 1/1987 | Kamienski | 568/678 X |

FOREIGN PATENT DOCUMENTS 2111066A  6/1983  United Kingdom .

Primary Examiner—Patrick P. Garvin
Attorney, Agent, or Firm—Richard P. Fennelly

[57] ABSTRACT

The transition metal component of a Ziegler-Natta type catalyst is prepared by the reaction of a magnesium alkoxy alkoxide with titanium tetrachloride. The transition metal component is combined with an aluminum compound to prepare a catalyst for the polymerization of olefins.

3 Claims, No Drawings

TRANSITION METAL CATALYST COMPONENT CONTAINING MAGNESIUM ALKOXY ALKOXIDES

FIELD OF THE INVENTION

This invention is an improved magnesium supported anionic coordination catalyst for the polymerization of olefins.

BACKGROUND OF THE INVENTION

A great number of anionic coordination catalyst systems are based on the use of titanium based catalyst on a magnesium chloride support.

A typical catalyst system employing magnesium chloride is disclosed in British Pat. No. 2,111,066 assigned to Mitsui Petrochemical Industries Ltd.

Certain prior art patents teach magnesium compound supported Ziegler-Natta type catalysts that do not directly employ magnesium chloride in catalyst preparation. In particular, U.S. Pat. No. 3,644,318 describes a mixed catalyst component which is the reaction product of magnesium alcoholates with tetravalent halogenated titanium compounds.

Other prior art patents using alkoxides as a magnesium source for formation of an olefin polymerization catalyst are U.S. Pat. Nos. 4,144,390; 4,277,372; 4,460,701; 4,485,186; 4,497,905, and U.S. Pat. No. Re. 31,099.

It is the discovery of co-pending application Ser. No. 861,392 filed 05/09/86, that highly organic solvent soluble alcoholates of magnesium can be prepared if magnesium is reacted with alkoxy alcohols. The resultant alkoxy alcohol derivates of magnesium are readily soluble in organic solvents such as hexane, heptane, toluene, xylene, and etc.

The prior art does not recognize the advantageous use of highly organic solvent soluble alkoxy alkoxides of magnesium. Moreover, the prior art generally employs halogenating agents other than the transition metal halides which are normally part of the polymerization catalyst.

It is desirable to develop new anionic coordination catalyst systems having novel sources of magnesium to serve as support for titanium-based catalysts.

SUMMARY OF THE INVENTION

This invention is an anionic coordination catalyst component formed from the reaction of an alkoxy alkoxide of magnesium with titanium tetrachloride. Moreover, this invention is an anionic coordination catalyst suitable for the polymerization of olefins, which catalyst is prepared by combining (i) the reaction product of an alkoxy alkoxide magnesium compound and titanium tetrachloride with (ii) an organoaluminum compound.

DETAILED DESCRIPTION OF THE INVENTION

The Ziegler-Natta type anionic coordination catalysts are generally prepared by combining a transition metal component with an aluminum co-catalyst. It is particularly desirable to first form the titanium catalyst component and then combine it with the aluminum co-catalyst just prior to the time of actual use. This invention enables the formation of a first transition metal catalyst component from the combination of titanium tetrahalide and a magnesium alkoxy alkoxide without the presence of aluminum co-catalyst or an extra halogenating agent ingredient.

The catalyst system of the invention uses a magnesium-containing support for a titanium-containing catalyst component. The magnesium support is created by the reaction of a magnesium alkoxy alkoxide with titanium tetrachloride.

The magnesium alkoxyalkoxide catalyst components suitable for use in the process and formation of catalyst of this invention are described in copending patent application Ser. No. 861,392 filed 05/09/86. Suitable magnesium alkoxides as those represented by the formula:

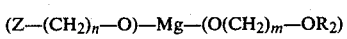

$$(Z-(CH_2)_n-O)-Mg-(O(CH_2)_m-OR_2)$$

wherein n and m are the same or different positive integers from 1 to 12; Z is $(R_1O)-$ or $(R_1)-$; and $R_1$ and $R_2$ are the same or different hydrocarbon radicals containing 1 to 20 carbon atoms. A preferred magnesium alkoxide has $R_1$ and $R_2$ alkyl groups of 1 to 12 carbon atoms, and integer values of n and m each less than or equal to 4.

Exemplary magnesium alkoxy alkoxides are as follows:

Magnesium bis(2-methoxyethylate)
Magnesium bis(2-ethoxyethylate)
Magnesium bis(2-butyoxyethylate)
Magnesium bis(3-methoxypropylate)
Magnesium bis(3-ethoxypropylate)
Magnesium bis(3-propoxypropylate)
Magnesium bis(3-methoxybutylate)

The alkoxy alkoxides of magnesium used in the catalyst preparation of the invention are prepared by the direct reaction of metallic magnesium with one or more alkoxy alcohols. A catalyst such as iodine or mercuric chloride may be used to promote the alkoxide forming reaction. The defining characteristic of an alkoxy alkoxide being "organic solvent soluble" is defined herein to be a solubility of at least 15 weight percent at ambient (approx. 20° C.) temperature in toluene or 2-methoxyethanol or 2-butoxybutanol.

The transition metal polymerization catalyst component is formed by the reaction of (i) the magnesium alkoxy alkoxide with, (ii) titanium tetrachloride. The molar proportions of magnesium alkoxide (i) to titanium halide (ii) are from 1:5 to 1:1000, with ratios of from 1:10 to 1:300 being preferred. Generally, the magnesium and titanium reactants are combined at above ambient temperatures, typically, from about 40° C. to about 150° C. Reaction time is not critical, but often requires several hours. The product of the first step catalyst component formation has the appearance of a dark powder, and typically contains from 0.5 to 10% titanium.

The first step titanium catalyst product may be stored under inert conditions before combination with its co-catalyst ingredient.

A suitable aluminum co-catalyst ingredient is selected from aluminum alkyls, aluminum halides and/or aluminum organo halides. The aluminum component may be represented by the formula:

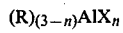

$$(R)_{(3-n)}AlX_n$$

wherein R is an organo group and X is a halogen selected from chlorine, bromine, or iodine and n is zero or an integer from 1 to 2. The mole ratio of tatanium tetrahalide to aluminum component in the combined catalyst system is from about 1:5 to about 1:500. The transition metal catalyst component and the aluminum co-catalyst component are combined simply by mixing, although the components may be milled together if desired.

A wide variety of catalyst addition agents, including activators and electron donors, may be used together with the essential magnesium alkoxy alkoxide, titanium tetrachloride, and aluminum catalyst components.

It is preferable to add the aluminum co-catalyst component to the titanium component just prior to the use of the catalyst for polymerization.

Catalyst adjuvants such as electron donors are useful in increasing the efficiency of the catalyst of the invention. Typical electron donors are selected from the group consisting of monocarboxylic acid esters, aliphatic carboxylic acids, carboxylic acid anhydrides, ketones, aliphatic ethers and organo silicon compounds. Illustrative electron donors are phthalic anhydride, diisobutylphthalate, phenyltriethoxysilane and diphenyldimethoxysilane. In particular, aromatic polycarboxylic acid esters such as: monoethyl phthalate, dimethyl phthalate, methylethyl phthalate, monoisobutyl phthalate, diethyl phthalate, ethyl isobutylphthalate, di-n-propyl phthalate, diisopropyl phthalate, di-n-butyl phthalate, diisobutyl phthalate, di-n-heptyl phthalate, di-2-ethylhexyl phthalate, di-n-octyl phthalate, dineopentyl phthalate, didecyl phthalate, benzyl butyl phthalate, diphenyl phthalate, diethyl naphthalenedicarboxylate and dibutyl naphthalenedicarboxylate are useful as adjuvants.

Polymerization of olefins is accomplished by contacting the olefin with the polymerization catalyst of the invention in a liquid reaction medium. The liquid reaction medium is typically selected from liquid propylene, heptane, hexane, benzene, toluene, or mixtures thereof. The polymerization conditions are not generally critical. The polymerization is conducted in liquid phase (solution or suspension) at temperatures from about 0° C. to the boiling point of the liquid phase. Generally, temperatures in the range of 15° C. to 150° C. are suitable. The pressure may be subatmospheric, ambient, or superatmospheric. In addtion, hydrogen gas may be used at moderate pressures to control the molecular weight of the reaction products.

The catalyst of the invention is useful for the polymerization of ethylene, alpha olefins or mixtures thereof. The polymerization of propylene is particularly desirable using the catalyst of the invention.

The practice of the invention is illustrated by but not limited to the following Example:

EXAMPLE

Part A—Preparation of di(2-butoxyethoxy)magnesium (DBEM)

125 milliliters of 2-butoxyethanol and 250 grams of heptane were placed in a flask, and brought to reflux. Magnesium metal (12.9 grams) was added in small aliquots to control the vigorous evolution of hydrogen. The mixture was refluxed for 1 hour after the addition of the final aliquot of magnesium. The colorless mixture was filtered to remove a small amount of a black precipitate, yielding 313 grams of magnesium alkoxide solution.

Part B—Preparation of catalyst 29.4 grams of the solution of Part A were used having a total content of 10.3 grams of DBEM. 35 ml. of decane and 2.1 grams of phthalic anhydride were added to the DBEM solution. This solution was added dropwise to 200 ml. of titanium tetrachloride maintained at −20° C. The dropwise addition was conducted for 45 minutes then when complete the reaction mixture was heated to 110° C. over a period of 3 hours. Upon reaching a temperature of 110° C., 2.9 grams of di-isobutylphthalate were added. The mixture was maintained at 110° C. and stirred at 350 rpm for 2.5 hours. The mixture was filtered at 110° C. to yield a solid powder.

The solid resulting from the reaction was mixed with 275 ml. of titanium tetrachloride and heated at 110° C. for 2 hours. Then 200 ml. of toluene were added and the mixture heated to 110° C. for 40 minutes. The mixture was filtered at 110° C. and the solids washed three times with hexane and vacuum dried. Yield was 6.2 grams of gray-black powder containing 6.55% titanium.

Part C—Polymerization of propylene

The catalyst prepared in Part B was tested in a propylene polymerization test. 150 mg. of catalyst, 10 millimoles of triethyl aluminum, and 0.5 millimoles diphenyl dimethoxy silane were added to a 4.5 liter autoclave containing 2 liters of hexane. Hydrogen gas at 2 psig. (13790 pascal) was added, and the reactor pressurized to 100 psig. (689500 pascal) with propylene and maintained at 70° C. while stirring at 400 rpm. After 2 hours, the contents were discharged. The yield was 1360 grams of polypropylene per gram of catalyst. The polymer had an isotactic index of 94.8%.

What is claimed is:

1. A process for forming a transition metal polymerization catalyst component comprising reacting (i) a soluble magnesium alkoxy alkoxide, solubilized in organic solvent, represented by the formula:

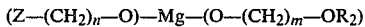

$(Z-(CH_2)_n-O)-Mg-(O-(CH_2)_m-OR_2)$ wherein n and m are the same or different positive integers from 1 to 12; Z is $(R_1O)-$ or $(R_1)-$, and $R_1$ and $R_2$ are the same or different hydrocarbon radicals containing 1 to 20 carbon atoms; with (ii) titanium tetrachloride, wherein the mole ratio of (i) to (ii) is from 1:5 to 1:1000.

2. The process of claim 1 wherein $R_1$ and $R_2$ are alkyl groups of 1 to 12 carbon atoms and n and m are each numbers less than or equal to 4.

3. The process of claim 1 wherein the magnesium alkoxy alkoxide is selected from the group consisting of: 
magnesium bis(2-methoxyethylate) 
magnesium bis(2-ethoxyethylate) 
magnesium bis(2-butoxyethylate) 
magnesium bis(3-methoxypropylate) 
magnesium bis(3-ethoxypropylate) 
magnesium bis(3-propoxypropylate) 
magnesium bis(3-methoxybutylate)

* * * * *